3,330,808
COPOLYMERS OF PERFLUOROOLEFINS AND AN ALDEHYDE AND PROCESS OF PREPARING SAME
Donald L. Miller, Norman L. Madison, and Douglas A. Rausch, Midland, Mich., assignors to The Dow Chemical Company, Midland, Mich., a corporation of Delaware
No Drawing. Filed Oct. 12, 1964, Ser. No. 403,380
7 Claims. (Cl. 260—73)

This invention relates to polymeric compositions and more particularly is concerned with a novel polymer of a perfluoroolefin and an aldehyde type carbonyl compound and to a method for the preparation thereof.

This novel composition comprises a copolymer having at a maximum about one gram mole equivalent of the olefin for each gram mole equivalent of the aldehyde type carbonyl material wherein the two constituents are joined in the polymer chain through oxygen atoms. To illustrate, in a 1/1 polymer, i.e. 1 gram mole olefin per gram mole of formaldehyde, for example, the resulting polymer is composed of a plurality of joined perfluorocarbon-aldehyde monomeric units. The 1/1 polymer in this case then corresponds to the empirical formula

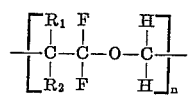

wherein $R_1$ is a perhalo substituted alkyl radical, $R_2$ is either fluorine or a perhalo substituted alkyl radical and $n$ is an integer greater than 1.

In other embodiments, the ratio of aldehyde type reactant to perhaloolefin in the polymer product can be greater than 1.

The term "halo" as used herein with reference to the olefin reactants is meant to include chloro- and fluoro-substituents. Perhaloolefins suitable for use in the present invention include, for example, perfluoroolefins and perchloroolefins as well as mixed chloro- and fluoro-substituted perhalo substituted olefins. Perfluoropropene and perfluoroisobutylene are particularly desirable reactants in that these lead to highly fluorinated polymeric products.

Aldehydes suitable for use in preparing the present composition include aliphatic aldehydes such as formaldehyde acetaldehyde and the like. Formaldehyde is a particularly effective aldehyde reactant.

The resulting perfluoroolefin-formaldehyde polymers are both oleophobic and hydrophobic. The compositions readily are preparable in liquid, wax, spongy and in massive solid form. This latter form of the product exhibits elastomeric or resinous properties. Additionally, the spongy and solid forms of the polymers are substantially insoluble in a wide variety of conventional organic and aqueous polar and non-polar solvent materials, e.g. ethers, halocarbons, mineral acids such as concentrated sulfuric acid, inorganic bases such as aqueous sodium hydroxide (20% NaOH), dimethyl sulfoxide, dimethyl formamide, water, alcohols such as methanol and ethanol, ketones such as acetone, and hydrocarbons.

These products find use as lubricants and flame retardants.

Generally, the polymer is prepared by reacting a perhaloolefin with an aldehydic material at a temperature of from about room temperature, (i.e. 18–25° C.) to about −80° C. or lower for a period of up to 24 hours or more under autogenous pressures in the presence of an inert solvent for the reactant members.

Ordinarily, in preparing the perfluoroolefin-formaldehye copolymer the reactants, at gram mole proportions of perfluoroolefin/formaldehyde from about 1/5 to about 5/1, are reacted at a temperature of from about −20 to about −80° C. for a period of from several minutes (~5–10 minutes) to about 24 hours, in a sealed reactor under the vapor pressure of the reactants employed. The preparation is carried out in the presence of an inert solvent, e.g. diethyl ether or dimethylformamide, either by direct reaction of the comonomer reactants or in the presence of from about 0.01 to about 1 mole percent, preferably from about 0.01 to about 0.1 mole percent (based on the total amount of reactants) of a weak base material catalyst. Examples of suitable catalysts are alkali metal fluorides such as cesium fluoride or rubidium fluoride, alkali metal acetates such as sodium acetate or potassium acetate, alkaline earth metal carbonates, alkali metal carbonates, organic nitrogen bases such as pyridine, quaternary ammonium salts and the like.

The following examples will will serve to further illustrate the present invention but are not meant to limit it thereto.

Example 1.—About 5 cubic centimeters of diethyl ether and from about 0.03 to about 0.1 gram of substantially anhydrous cesium fluoride were introduced into a 25 cubic centimeter glass ampoule. The ampoule was cooled to about minus 190° C. and attached to a low pressure line maintained at an absolute pressure of about 0.001 millimeter mercury pressure. The ampoule was maintained at this pressure to remove volatile materials from the system after which about 0.015 gram moles each of formaldehyde and perfluoroisobutylene were condensed into the ampoule. The ampoule then was sealed and warmed to about minus 20° C. The reaction mixture was maintained and agitated at this temperature for about 16 hours. After the reaction period, the ampoule was recooled to about minus 190° C. and opened. The contents were warmed to room temperature to allow any unreacted perfluoroisobutylene to volatilize and then heated to 80° to drive off any residual diethyl ether. The resulting product mixture was washed with water and fractionated by extraction with a solvent mixture of 1,1,2 - trichloro - 1,2,2-trifluoroethane and acetone. This produced an oil which was soluble in and extracted into the solvent mixture and a non-solvent soluble waxy residue. The oil-solvent extract was separated from the waxy solid material.

The oil product was recovered from the solvent mixture. Elemental analysis indicated F, 50.18%; C, 28.75%; H, 1.90%; O, 19.17%. This is consistent for a copolymer having a formaldehyde/perfluoroisobutylene ratio of about 3. Determination of the molecular weight of the oil product indicated this to be about 1770. The oil-like polymer was soluble both in acetone and 1,1,2-trichloro-1,2,2,-trifluoroethane.

Analysis of the wax product fraction gave F, 39.5%. This is consistent for a copolymer having a formaldehyde/perfluoroisobutylene ratio of about 6. The waxy polymer product fraction was found to have a molecular weight of about 3900. This product was soluble in acetone but insoluble in 1,1,2-trichloro-1,2,2-trifluoroethane.

Proof of structure was substantiated by infrared spectra of the polymeric products which showed strong $CH_2$ absorption doublets from about 3.3 to 3.45 microns and a short band at approximately 5.6 microns corresponding to a fluorine substituted carbon-carbon double bond. Strong CF bands were also observed in the region of about 7.4 to 8.9 microns. In addition, bands at 9.1, 9.5 and 10.0 microns were present, the latter being attributable to carbon-oxygen single bonds.

Example 2.—The procedure described in Example 1 was repeated except that the mole ratio of formaldehyde to perfluoroisobutylene reactants employed was 2 and the reaction was carried out at about minus 40° C.

The polymer product upon fractionation and separation consisted of an oil containing about 50 percent fluorine, a wax containing 40 percent fluorine and a spongy solid containing 29 percent fluorine.

The oil product, a polymer having a formaldehyde/perfluoroisobutylene ratio of about 3, was found to have a molecular weight of about 1610. After either heating the oil by itself at 180° C. for about 2 hours or on a steam bath in warm sulfuric acid for about the same time period the recovered product was found to have undergone essentially no change in the fluorine content.

The wax was found to have a molecular weight of about 3980.

The spongy solid was insoluble in the test vehicle and its molecular weight, therefore, could not be determined by the standard ebullioscopic technique. This product softened at about 90° C. melted at from about 140 to about 150° C. and evolved gas at about 200° C. when heated on a hot block.

X-ray diffraction analysis of both the wax product and the spongy polymer indicated the presence of crystalline polyformaldehyde as a coproduct. In the spongy material this was found to be present in an amount of about 50% of the total product mass and in the range of 10 to about 20 percent in the wax material. Adjustment of the fluorine analysis to account for this coproduct indicates the actual fluorine content of the wax-like polymer is about 45–47%, i.e. a polymer having a formaldehyde/perfluoroisobutylene ratio of about 4. The spongy polymer then actually has a fluorine content of about 58% indicative of a polymer having a formaldehyde/perfluoroisobutylene ratio of 2.

*Example 3.*—Following the procedure set forth in Example 1, about 0.007 gram mole perfluoroisobutylene and 0.017 gram mole of formaldehyde were reacted in about 2 cubic centimeters of diethyl ether solvent in the presence of about 30 milligrams of cesium fluoride catalyst for about 16 hours at about minus 30° C. The resulting product was a white gum-like mass which after washing with water and drying in a steam bath at about 100° C. was found to contain about 60.6 percent fluorine. The lengthy period of standing at the elevated temperature was to provide for depolymerization and removal of polyformaldehyde that might have been coproduced. This was indicative of about a 1/1 copolymer of formaldehyde/perfluoroisobutylene; the theoretical fluorine content of such a polymer is about 66 percent.

*Example 4.*—A number of runs were made with formaldehyde and perfluoropropene following the general procedure described in Example 1, but employing certain specific reaction conditions and reactant compositions both in the presence of trace amounts or the absence of a catalyst.

Infrared spectra of the resulting product supported the proposed structure for the formaldehyde-perfluoropropene copolymer. The experimental data and results for a number of runs are summarized in Table I.

In a manner similar to that described for the foregoing examples, perfluoropentene-1, perfluoro-2-methyl butene-1, perfluoro-3-methyl butene-1, perfluorohexene-1, perfluoro-2-ethylbutene-1, perfluoro-3-ethylbutene-1 and the like perfluoroolefins can be reacted with formaldehyde, acetaldehyde and the like aldehyde type carbonyl compounds to provide the corresponding perfluorocarbon-aldehyde copolymer. Similarly perchloropropene-1, monochloropentafluoropropene, dichlorohexafluoroisobutylene and the like perchloro- and perchlorofluoro-substituted olefins can similarly be reacted with formaldehyde, acetaldehyde and the like aldehyde type carbonyl compounds to provide the corresponding perhalocarbon-aldehyde copolymer.

Various modifications can be made in the present invention without departing from the spirit or scope thereof for it is understood that we limit ourselves only as defined in the appended claims.

We claim:
1. A composition of matter comprising a solid copolymer containing recurring oxymethylene units of a perhaloolefin and an aldehyde member selected from the group consisting of formaldehyde and acetaldehyde, said perhaloolefin being a perfluoroolefin wherein the total number of carbon ranges from 3 to about 6, said copolymer having at a maximum about one gram mole equivalent of said perhaloolefin for each gram mole of said aldehyde, the perhaloolefin and aldehyde components being joined in the polymer chain through oxygen atoms said copolymer being prepared by reacting an agitated mixture of said perhaloolefin and said aldehyde in an inert solvent at a temperature of from about minus 80° C. to about room temperature for a period of from about several minutes to about 96 hours under the vapor pressure of the reactants, the gram mole proportions of said perhaloolefin and said aldehyde in the initial mixture ranging from about 1/5 to about 5/1.

2. The composition of matter as defined in claim 1 wherein the perhaloolefin is a member selected from the group consisting of perfluoropropene and perfluoroisobutylene and said aldehyde is formaldehyde.

3. The composition of matter as defined in claim 1 wherein the perhaloolefin is perfluoropropene and said aldehyde is formaldehyde.

4. The composition of matter as defined in claim 1 wherein the perhaloolefin is perfluoroisobutylene and said aldehyde is formaldehyde.

5. A process for preparing a solid copolymer containing recurring oxymethylene units of a perhaloolefin and an aldehyde which comprises;
   (a) preparing a mixture of a perhaloolefin and an aldehyde in an inert solvent, the gram mole proportions of said perhaloolefin and said aldehyde ranging from about 1/5 to about 5/1, said perhaloolefin being a perfluoroolefin wherein the total number of carbons

TABLE I

| Run | Perfluoropropene (g.) | Formaldehyde (g.) | Added Salt | Solvent (cc.) | Reaction Time, hours | Reaction Temp., ° C. | Fluorine in Polymer, percent | Results $CH_2O/C_3F_6$ [1] Mole Ratio in Polymer |
|---|---|---|---|---|---|---|---|---|
| 1 | 1.8 | 0.2 | NaF | DMF [2] 2.5. | 48 | Minus 45 to room | 37.7 | 5 |
| 2 | 1.8 | 0.18 | NaF | DMF [3] 2.5. | 96 | Minus 37 to room | 34.0 | 6 |
| 3 | 1.8 | 0.18 | NaF | DMF [3] 2.0. | 96 | Minus 35 | 41.5 | 4 |
| 4 | 1.8 | 0.18 | None | DMF [3] 2.0. | 96 | do | 39.5 | ~4.5 |

[1] $C_3F_6$, perfluoropropene.
[2] Dimethylformamide.
[3] DMF contained 300 p.p.m. water.

ranges from 3 to about 6 and said aldehyde being a member selected from the group consisting of formaldehyde and acetaldehyde, (b) agitating this mixture at a temperature of from about minus 80° C. to about room temperature for a period of from about several minutes to about 96 hours under the vapor pressure of the reactants, and (c) recovering a copolymer of said perhaloolefin and said aldehyde, said copolymer being characterized as having at a maximum about a gram mole equivalent of said perhaloolefin for each gram mole of said aldehyde and the perhaloolefin and aldehyde being joined in the polymer chain through oxygen atoms.

6. The process as defined in claim 5 and including the step of carrying out the reaction in the presence of a small amount of a weak base material catalyst, said catalyst being a member selected from the group consisting of alkali metal fluorides, alkali metal acetates, alkaline earth metal carbonates, alkali metal carbonates, organic nitrogen bases and quaternary ammonium salts.

7. The process as defined in claim 5 wherein the perhaloolefin is a member selected from the group consisting of perfluoropropene and perfluoroisobutylene and the aldehyde is formaldehyde.

References Cited

UNITED STATES PATENTS

| 3,080,428 | 3/1963 | Weinmayr | 260—614 |
| 3,087,913 | 4/1963 | Kray et al. | 260—73 |

FOREIGN PATENTS 614,946   7/1962   Belgium.

OTHER REFERENCES

Prins: "Synthesis of Polychloro Compounds With Aluminum Chloride," Recueil des Travaux Chimiques des Parp-Bas, vol. T 72, 1953, pp. 867–877.

JOSEPH L. SCHOFER, *Primary Examiner.*

JAMES A. SEIDLECK, *Assistant Examiner.*